United States Patent [19]

Cupp et al.

[11] Patent Number: 4,626,335

[45] Date of Patent: Dec. 2, 1986

[54] LITHIUM ALLOY ANODE FOR THERMAL CELLS

[75] Inventors: Earl B. Cupp; D. Robert Cottingham, both of Joplin, Mo.

[73] Assignee: Eagle-Picher Industries, Inc., Cincinnati, Ohio

[21] Appl. No.: 769,025

[22] Filed: Aug. 26, 1985

[51] Int. Cl.$^4$ .................. C25C 11/06; H01M 4/36
[52] U.S. Cl. .................. 204/293; 252/182.1; 252/513; 429/103; 429/218
[58] Field of Search .................. 204/293; 252/182.1, 252/502, 513; 429/103, 218

[56] References Cited

U.S. PATENT DOCUMENTS

| | | | |
|---|---|---|---|
| 3,301,711 | 1/1967 | King, Jr. et al. | 429/218 |
| 3,891,460 | 6/1975 | Bowser et al. | 136/83 T |
| 3,930,888 | 1/1976 | Bowser et al. | 136/120 R |
| 4,013,818 | 3/1977 | Askew et al. | 429/112 |
| 4,048,395 | 9/1977 | San-Cheng Lai | 429/112 |
| 4,053,011 | 10/1977 | Riewald et al. | 164/97 |
| 4,119,769 | 10/1978 | Schneider et al. | 429/112 |
| 4,130,500 | 12/1978 | Melendrer et al. | 429/218 |
| 4,158,720 | 6/1979 | Kaun | 428/567 |
| 4,162,352 | 7/1979 | Sutula et al. | 429/218 |
| 4,221,849 | 9/1980 | Harney | 429/112 |
| 4,233,376 | 11/1980 | Atkinson et al. | 429/218 |
| 4,346,152 | 8/1982 | Sammells et al. | 429/218 |
| 4,358,513 | 11/1982 | Kaun | 429/218 |
| 4,461,816 | 7/1984 | Leribaux | 429/218 |

*Primary Examiner*—John F. Niebling
*Assistant Examiner*—Terryence Chapman
*Attorney, Agent, or Firm*—Wood, Herron & Evans

[57] ABSTRACT

Disclosed is an anode for a thermal cell wherein particles of a lithium alloy are compacted under pressure with particles of an inactive metal which binds the alloy particles together but does not alloy with them. Strength and workability of the anode alloy are thereby improved, with no or surprisingly little loss of electrochemical performance.

12 Claims, No Drawings

LITHIUM ALLOY ANODE FOR THERMAL CELLS

This invention relates to thermal cells, that is, electrochemical cells of the type which must be heated to several hundred degrees in order to be activated. More particularly it relates to thermal cells of the type having one or more thin "wafer" or pellet-like anodes wherein a lithium alloy is the active material.

BACKGROUND

Lithium alloys are used as the active anode material in thermal batteries, of both the primary (non-rechargeable) and the secondary (rechargeable) types. Such cells are activated for operation by heating to a temperature above about 400° C., in order to melt the otherwise solid electrolyte. Typically the electrolyte is a mixture of alkali metal halides, for example a eutectic mixture of potassium chloride and lithium chloride which melts at about 350° C. Common cathode materials, among others, are iron pyrite, calcium chromate and copper oxide. Pure lithium metal can be used as the anode in such cells, but it is very low melting (180° C.) and would be molten at the temperature at which the electrolyte melts, so that it might spill or flow within the cell, with resultant failure.

THE PRIOR ART

In order to provide an anode material which does not melt so readily, and to improve electrochemical performance, lithium has been alloyed with various metals. Thus, lithium alloyed with aluminum metal and powdered has been compacted under high pressure to form a "wafer" or pellet as it is often called in the industry, which is then stacked with wafers of electrolyte and cathode material, to form a cell. The major problem with such compacted lithium alloy anodes is that they have inadequate physical strength: they crack or fracture too easily in manufacture, assembly and use. Moreover, excessively high compressive forces are required to produce the thin pellets which are desirable in certain instances where only low electrochemical capacity is needed. In order to overcome this problem, it has been necessary to use thicker wafers than really needed from the standpoint of required capacity, in order to produce adequate physical strength. Since lithium alloys are expensive, this has substantially increased both cost and cell size.

Harney U.S. Pat. No. 4,221,849 teaches a method for making an anode material wherein lithium is melted and iron powder is added and mixed to form a homogeneous mixture which is then cooled into an ingot and rolled into strips for fabrication into anodes. The anode is used at temperatures which would exceed the melting point of lithium if not stabilized by the iron. Kaun U.S. Pat. No. 4,158,720 discloses a solid anode composition which is made by alloying aluminum with iron, then reducing the aluminum-iron alloy to particles and compacting them to form a porous substrate, then depositing lithium in the aluminum-iron alloy, as by electrochemical deposition.

Schneider et al U.S. Pat. No. 4,119,769 discloses a metal anode which comprises an iron or stainless steel wire mesh screen which is dipped in molten lithium. The anode is molten at the operating temperature of the battery. Lai U.S. Pat. No. 4,048,395 teaches a thermal cell with a ternary alloy of lithium, silicon, and iron, supported on a sintered plaque, screen or perforate plate. Bowser et al U.S. Pat. No. 3,930,888 teaches a lithium alloy anode, molten at use conditions, made by dipping a screen or foraminous substrate in molten anode metal and then removing and cooling the screen.

BRIEF DESCRIPTION OF THE INVENTION

In accordance with this invention a lithium alloy anode wafer is provided by first alloying lithium with a secondary metal such as aluminum, silicon, or boron, and which provides a higher melting, electrochemically active lithium anode alloy. A true alloy is formed in this first step, wherein the metals are in uniform solution and the composition is homogeneous throughout the alloy. The alloy is solidified and is ground or otherwise reduced to fine particles. These particles, in solid state, are mixed (without melting) with a powdered binder metal which is both conductive and electrochemically inert (at use conditions) with respect to the alloy, and which may, for example, be iron, nickel, copper, manganese, or mixtures thereof, to form a particulate mixture. This mixture, still in solid state, is compacted in a powdered metal press to form a pellet or wafer, wherein the binder metal particles adhere and bond (or cold weld) the alloy particles, without forming an alloy with them. The result is an integral, coherent mixture of particles of alloy and particles of binder metal.

It is found that in this manner anode wafers can be made which have electrical properties that often are as good as solid alloy anodes without the binder; yet they contain much less active component. The wafers are made into a cell or battery which is operated at a temperature at which they remain solid; usually this will be in the range of 400° to 675° C. Operation below the melting point eliminates the chance of molten anode metal flowing within the cell to cause shorting.

Surprisingly, the wafer or pellet can be made thinner than one prepared of the alloy alone and having the same lithium content. Moreover, the metal binder, at least in the preferred blends with the alloy, modifies the physical properties of the mix, making it easier to compact and reducing die wear. Further, the fact that expensive alloy can be replaced by lower cost metal binder results in a significant reduction in the cost of the anode, but with no sacrifice in reliability.

DETAILED DESCRIPTION

The common lithium anode alloys preferred for use herein include lithium-aluminum alloys, lithium-silicon alloys, and lithium-boron alloys. The following proportions are usable, but should not be taken as critical or limiting:

|  | Wt. % | Atomic % |
|---|---|---|
| lithium-aluminum alloy | | |
| lithium | 18–33 | 46–66 |
| aluminum | 82–67 | 54–34 |
| lithium-silicon alloy | | |
| lithium | 30–60 | 63–86 |
| silicon | 70–40 | 37–14 |
| lithium-boron alloy | | |
| lithium | 40 | 50 |
| boron | 60 | 50 |

It is also contemplated that the lithium may be alloyed with different alloying metals than the three listed above, and that ternary alloys can be used.

The alloys can be prepared in known manner, by melting the materials and cooling to solidify the alloy after formation.

Once prepared the alloy is reduced to particles, which may be done for example by attrition milling or by burr milling. The particles may be in the approximate size range of about 38 to 250 microns (400 mesh to 60 mesh screen).

The alloy particles are then mixed with a binder comprising a powdered metal which is inactive with respect to the alloy under use conditions. The binder metal may for example be iron, copper, nickel, manganese or mixtures thereof. The proportions of alloy to binder are not critical and can be adjusted to provide a composite which will provide a desired electrical capacity in a predetermined wafer size. The composite may contain as little as 25 wt. % of the alloy, or as much as 75% of the alloy. Metallurgy grade iron and copper, and battery grade nickel powders, are the preferred grades.

The particulate alloy/binder mixture is then shaped into pellets or wafers by compacting it in a powdered metal press. The resultant product may, for example, comprise a very thin, circular wafer or pellet. The binder when added to the alloy modifies the alloy properties and makes compaction easier and reduces die wear.

In the finished wafer the binder is not alloyed with or coated with the alloy particles: the binder particles remain discrete and are bonded physically to the alloy particles to form a unitary heterogeneous mass.

We have found it possible to make anodes as thin as 1/100 of an inch, thinner than can usually be made in the absence of binder, yet the resultant anodes can have an electrical capacity which essentially equals that of the undiluted alloy. This is shown by the following comparative example:

EXAMPLE 1

Li-Si alloy particles bonded with iron particles

An alloy is prepared comprising 44 parts by weight (76 A%) lithium and 56 parts (24 A %) silicon. This alloy was crushed to particles of +45−150 microns size. 75 parts of alloy particles were mixed with 25 parts of metallurgical iron particles (+45−75 microns size) and were compacted in a hydraulic press at 10,000 psi at room temperature, to form a round wafer 1.37" in diameter, 0.01" thick, and weighing 0.25 grams. These wafers were physically coherent and were durable enough to withstand the handling incidental to manufacture and use. They were assembled into a cell with Li Cl/K cl electrolyte and $FeS_2$ cathodes. The cell was operated at 500° C., below the melting point of the alloy (if pure), at which the wafers did not melt. The capacity of the anode (at 80% of peak voltage) was 12.6 amp. minutes. This extreme thinness is thinner than could be achieved if the alloy particles were compacted without a binder, as shown by the following.

Comparison with unbonded Li-Si alloy

An anode was prepared of lithium and silicon alloy in substantially the same proportions as Example 1, but containing no binder metal. This alloy contained 44 parts wt. (76 A%) lithium and 56 parts (24 A%) silicon. Using the same press as before, it was formed into an anode of the same diameter, but which could be compacted to only 0.014", weighing 0.21 grams, without loss of strength. Greater pressure tended to result in wafer cracking upon release of pressure. This anode, though 40% thicker and containing only undiluted alloy, had essentially the same capacity, 12.8 amp. mins., as the thinner "diluted" anode.

It is an important advantage of the invention that the alloy is not deposited on an inert carrier screen, or absorbed in a sintered plaque or into an inert "sponge" matrix. Use of a screen, plaque or sponge would necessarily limit the minimum thickness of the anode; moreover, impregnation into a sponge or plaque is delicate, increases cost, and requires melting the alloy.

The battery containing the anode is operated at a temperature above 400° C. but at which the alloy in the composite remains a solid. Depending on the nature of the composite, the operating temperature may be as high as 675° C. Since the alloy remains solid, it does not separate as it would, for example, in a high spin (rocket or projectile) application.

A further advantage of the invention is that in thin wafers the cost of the composite anode is substantially less than one of solid alloy, meeting the same required capacity, depending on the proportion of alloy used. As shown above, an anode in accordance with the invention can have essentially the same electrical capacity as an anode which is made of undiluted alloy. However, the cost of the alloy itself is high, typically of the order of $100 per pound, whereas iron powder is much less expensive, e.g., $6.00 per pound. Use of binder can thus reduce the cost of materials by almost half, without harming performance.

EXAMPLE 2

Li-Al alloy particles bonded with iron particles

An alloy was prepared comprising 20 wt. parts (50 A%) lithium and 80 parts (50 A%) aluminum, in the manner described previously. This alloy when cooled was reduced to particles. 25 parts alloy were blended with 75 parts (48 A%) iron particles, to give a composite ratio of 5 wt. % (26 A%) lithium, 20 wt. % (26 A%) aluminum, and 75 wt. % iron (48 A%). The mixture was compacted to make wafers of 1.37 inch diameter, 0.1 inch thickness, weighing 0.85 grams. The 80% capacity of a battery assembled using the resulting wafers was 6.39 ampere minutes.

Comparison with unbonded Li-Al alloy

An unbonded alloy comprising 20 wt. parts lithium and 80 parts aluminum (50 A% Li, 50 A% Al) but not bonded, was formed to a circular wafer of 1.37 inch diameter, a thickness of 0.14 inches, and which weighed 0.40 grams. The alloy could not be compacted to a thinner wafer of adequate strength. The 80% capacity of a battery made from such anodes was 11.18 ampere minutes. If a lower capacity were all that were needed, the excess capacity would be wasted. By using a mixture bonded as in Example 2, cost could be greatly reduced, and a thinner pile made.

Having described the invention, what is claimed is:

1. The method of making a thermal cell which comprises,
    preparing an alloy of lithium and an alloying metal to form a high melting electrochemically active lithium anode alloy,
    comminuting said alloy to particles,
    blending the particles of said alloy with a powdered metal binder which is conductive and inactive at cell operating conditions, said binder being particulate, unalloyed iron, copper, nickel, or manganese, or a mixture of particles thereof, the particles of said binder being mixed with but distinct from the particles of said alloy the resulting blend being a mixture of such particles;

compacting said mixture under pressure to form an anode wafer therefrom, without melting said alloy, so that the wafer comprises a cohered mass of alloy particles and binder particles;

the use of said metal binder enabling said mixture to be compacted to a thinner wafer shape than without it; and assembling a thermal cell wherein one or more of said wafers comprises the anode of the cell.

2. The method of claim 1 comprising the further step of operating said cell at a temperature of at least 400° C. but lower than the temperature at which said wafers would melt.

3. The method of claim 1 wherein said alloy is a lithium-aluminum alloy; a lithium silicon alloy; or a lithium-boron alloy.

4. The method of claim 1 wherein said metal binder is metallurgical grade iron, copper, nickel, manganese, or a mixture of particles of such metals.

5. The method of claim 1 wherein said lithium anode alloy comprises, about 18–33 wt. % lithium and the balance aluminum.

6. The method of claim 5 wherein said binder metal is iron.

7. The method of claim 1 wherein said lithium anode alloy comprises, about 30–60 wt. % lithium and the balance silicon.

8. The method of claim 1 wherein said alloy is mixed with said binder metal in the proportion of about 25–75 wt. % alloy and the balance said binder metal.

9. The method of claim 1 wherein said thermal cell is a primary cell.

10. The method of claim 1 wherein said metal binder is metallurgical grade iron.

11. The method of claim 1 wherein said compacting is carried out as a dry-pressing step.

12. As an article of manufacture, an anode wafer for a thermal cell, said anode wafer comprising particles of a lithium anode alloy bonded with particles of a metal binder, said lithium anode alloy being of the class consisting of lithium-aluminum alloys; lithium-silicon alloys; and lithium-boron alloys, said metal binder being of the class consisting of unalloyed iron, copper, nickel, manganese; and mixtures thereof, and wherein substantially all said metal binder in said wafer remains present as a discrete phase, unalloyed with said lithium alloy.

* * * * *